Jan. 8, 1924.
H. WEILDING
1,480,483
CLUTCH DRIVING MECHANISM
Filed Aug. 11, 1921
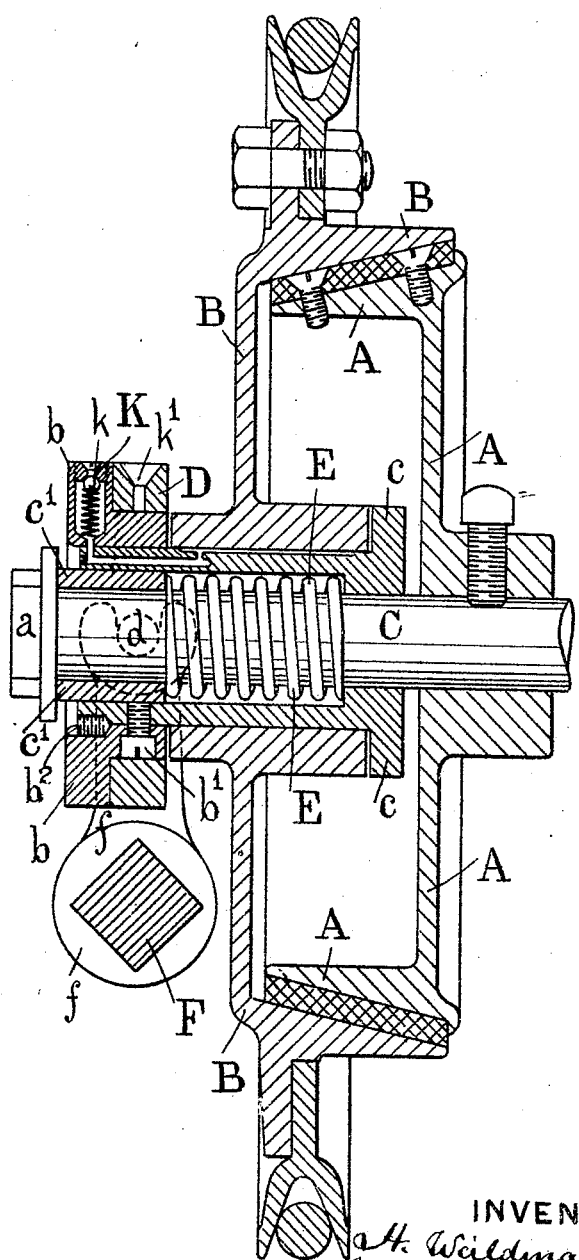
INVENTOR Patented Jan. 8, 1924.

1,480,483

UNITED STATES PATENT OFFICE.

HENRY WEILDING, OF BELFAST, IRELAND, ASSIGNOR TO YORK STREET FLAX SPINNING COMPANY LIMITED, OF BELFAST, IRELAND.

CLUTCH DRIVING MECHANISM.

Application filed August 11, 1921. Serial No. 491,529.

*To all whom it may concern:*

Be it known that I, HENRY WEILDING, a British subject, residing at Belfast, Ireland, have invented certain new and useful Improvements in Clutch Driving Mechanism, of which the following is a specification.

This invention relates to a friction clutch driving mechanism with striking gear operated by a screw more particularly designed for the driving of spinning frames for flax and other fibre.

It consists in the particular construction and disposition of the parts hereinafter described with reference to the accompanying drawing.

The figure is a sectional elevation through the friction pulleys.

The driven element is constructed with a clutch member A to be attached to the shaft C of the machine to be driven and a driving member B (preferably with a V groove around its periphery for a rope drive) is mounted loosely on a sleeve c upon which it is free to rotate. The sleeve c is loosely mounted on the shaft C and at its outer end over a brush c' which fits closely or is keyed on to the shaft. The interior of the sleeve c is bored out larger than the shaft C at one end forming a recess therein and a spring E is inserted which surrounds the shaft C and abuts at one end against the interior of the sleeve c and at the other end against the bush c'. The bush c' is prevented from moving longitudinally on the shaft C, and is held in position thereon by a screw a screwed into the end of the shaft. The tendency of the spring compressed between the sleeve and the bush is to move the sleeve c along the shaft. The driving member B of the clutch is held in position on the sleeve c by a stop washer or ring b which is secured to the sleeve c by a set screw or screws b' placed radially or by a grub screw or screws b² inserted longitudinally, or both so that any movement of the sleeve c longitudinally of the shaft C carries with it the clutch member B. On the stop washer or ring b a loose ring D is placed which is capable of rotary movement in relation to the stop washer b and is fitted with trunnions or pins d with which arms f on a shaft F engage.

This construction forms a striking gear, the driving clutch member B being forced into contact with the driven clutch member A by the spring E within the sleeve c, and withdrawn from contact by the arms f on the rotation of the shaft F.

By this construction when the clutch members are out of contact there is little or no friction against the boss of the continuously running driving member B, as the clearance between the stop washer b and the flange on the screw a allows the sleeve c to move the member B out of engagement with the member A, in which position the member B is again in equilibrium in its bearing on the sleeve c.

An oil passage K closed by a spring and ball valve k is provided in the stop washer b and sleeve c to lubricate the driving member B when running free on the sleeve, and the ring D is lubricated by an oil passage k'.

The V driving rim of the driving member B of the clutch is preferably bolted thereto and for it a belt rim or toothed driving rim may be substituted.

With a rope drive the cyclic variations due to the prime mover are damped out or absorbed in the rope giving a steady turning movement which is very desirable in certain classes of spinning.

What I claim as my invention and desire to protect by Letters Patent is:—

A friction clutch driving mechanism for spinning frames and other machines comprising the combination with a driven clutch member adapted to be affixed to a shaft, a driving clutch member free to rotate around a shaft and a sleeve upon which the latter is free to rotate, formed with an internal recess, of a spring within the recess in the sleeve to move it and the clutch member mounted thereon in one direction, a bush within the sleeve against which one end of the spring abuts and adapted to be affixed to the shaft, a stop washer secured to the exterior of the sleeve to maintain the clutch member in position thereon and a ring on the stop washer provided with trunnions by which to move the sleeve against the pressure of the spring substantially as described.

In testimony whereof I have hereunto set my hand in presence of two subscribing witnesses this 21st day of July, 1921.

HENRY WEILDING.

Witnesses:
JOHN J. ROBINSON,
SAMUEL S. LOWSON.